(12) United States Patent
Cheiky et al.

(10) Patent No.: US 6,522,102 B1
(45) Date of Patent: Feb. 18, 2003

(54) MULTIPLE PLATEAU BATTERY CHARGING METHOD AND SYSTEM TO CHARGE TO THE SECOND PLATEAU

(75) Inventors: Michael Cheiky, Santa Barbara, CA (US); Te-Chien F. Yang, Santa Barbara, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 0 days.

(21) Appl. No.: 10/021,839

(22) Filed: Dec. 14, 2001

(51) Int. Cl.[7] .................... H01M 10/44; H01M 10/46
(52) U.S. Cl. ........................... 320/125; 320/160
(58) Field of Search ................... 320/125, 128, 320/132, 133, 155, 157, 158, 160, 162, 163, 164

(56) References Cited

U.S. PATENT DOCUMENTS

| | | |
|---|---|---|
| 3,708,738 A | 1/1973 | Crawford et al. |
| 4,113,921 A | 9/1978 | Goldstein et al. |
| 4,388,582 A | 6/1983 | Saar et al. |
| 4,392,101 A | 7/1983 | Saar et al. |
| 4,719,401 A | 1/1988 | Altmeid |
| 4,745,349 A | 5/1988 | Palanisamy |
| 5,049,803 A | 9/1991 | Palanisamy |
| 5,089,765 A | 2/1992 | Yamaguchi |
| 5,160,880 A | 11/1992 | Palanisamy |
| 5,166,596 A | 11/1992 | Goedken |
| 5,204,611 A | 4/1993 | Nor et al. |
| 5,270,635 A | 12/1993 | Hoffman et al. |
| 5,307,000 A | 4/1994 | Pedrazhansky et al. |
| 5,387,857 A | 2/1995 | Honda et al. |
| 5,396,163 A | 3/1995 | Nor et al. |
| 5,438,250 A | 8/1995 | Retzlaff |
| 5,642,031 A | 6/1997 | Brotto |
| 5,721,688 A | 2/1998 | Bramwell |
| 5,747,964 A | 5/1998 | Turnbull |
| 5,821,733 A | 10/1998 | Turnbull |
| 5,982,144 A | 11/1999 | Johnson et al. |
| 5,994,878 A | 11/1999 | Ostergaard et al. |
| 6,025,696 A | 2/2000 | Linhart et al. |
| 6,037,751 A | 3/2000 | Klang |
| 6,097,172 A | 8/2000 | Pedrazhansky et al. |
| 6,104,167 A | 8/2000 | Bertness et al. |
| 6,124,700 A | 9/2000 | Nagal et al. |
| 6,137,268 A | 11/2000 | Mitchell et al. |
| 6,215,291 B1 | 4/2001 | Mercer |
| 6,215,312 B1 | 4/2001 | Hoenig et al. |
| 6,222,343 B1 | 4/2001 | Crisp et al. |
| 6,232,750 B1 | 5/2001 | Pedrazhansky et al. |
| 6,252,373 B1 | 6/2001 | Stefansson |

FOREIGN PATENT DOCUMENTS

| | | |
|---|---|---|
| EP | 1076397 A1 | 2/2001 |
| FR | 2683093 A1 | 4/1993 |
| GB | 892954 | 4/1962 |
| GB | 2178608 A | 2/1987 |
| WO | WO00/14848 | 3/2000 |
| WO | WO01/47086 | 6/2001 |

*Primary Examiner*—Edward H. Tso
(74) *Attorney, Agent, or Firm*—Marvin E. Jacobs

(57) ABSTRACT

A battery charging method and system, the battery charging method comprising: charging at least one battery at a first voltage for a first time duration; charging the batteries at a second voltage for a second time duration; determining state of charge of the batteries at the end of the second time duration; if the batteries are not substantially fully charged at the end of the second time duration, the total charging time is evaluated to determine if the batteries have been charged for a time duration greater than or equal to a third time duration, and if the total charging time has not exceeded or is not equal to the third time duration, charging the batteries at the first voltage for the first time duration and charging the batteries at the second voltage for the second time duration is repeated; if the batteries are substantially fully charged at the end of the second time duration, battery charging is ceased; or if the total charging time has exceeded or is equal to the third time duration at the end of the second time duration, battery charging is ceased. The battery charging system comprises: a current source; a cutoff voltage controller and timer; at least one battery; respective ones of voltage and current regulators, which regulate voltages applied to and current supplied to each of the batteries; current sensing means, which senses current flowing therethrough the batteries; and a system voltage and current regulator, which shunts current from the batteries.

21 Claims, 9 Drawing Sheets

MULTIPLE PLATEAU BATTERY CHARGING METHOD AND SYSTEM TO CHARGE TO THE SECOND PLATEAU

BACKGROUND OF THE INVENTION

1. Field of the Invention

The present invention relates generally to battery charging methods and system and more particularly to charging methods and systems for preventing battery overcharge.

2. Cross-references

The present application is related to two copending applications, one patent application, entitled "Battery Charging System," and the other patent application, entitled "Battery Charging Method and System," each by inventors Michael Cheiky and Te-Chien Felix Yang, serial numbers to be determined, each filed Dec. 14, 2001, which are included herein by this reference, and which are not admitted to be prior art with respect to the present invention.

3. Background Art

Rechargeable batteries, for storing electrical energy, and battery chargers, for charging batteries and bringing the batteries back to a charged state, after the batteries have been depleted, have been known and are common. Typically, the batteries are charged after full or partial depletion by delivering energy to the batteries and reversing chemical processes within the batteries, by applying a voltage to the batteries, forcing current through the batteries, and, thus, restoring charge. A common charging method is to apply a voltage source to the battery to be charged, which is greater than the battery voltage of the battery, and stop charging when the battery ceases to accept additional current. Such charging methods do not consider the state of charge of the battery at the onset of charging, and almost always result in deleterious effects on the battery, reduces performance and battery life.

A battery charging method that minimizes overcharging, and, thus, increases battery performance and life is needed. The battery charging method should be capable of charging one or more batteries simultaneously, evaluate the state of charge of the batteries, i.e., whether the batteries are substantially charged or substantially fully depleted early during the charging cycle, and charge the batteries accordingly, based upon such state of charge.

Batteries generally consist of two or more galvanic cells. Two electrodes of dissimilar materials are isolated one form the other electronically, but placed in a common ionically conductive electrolyte. Overcharge of the battery can lead to complicated and undesirable side reactions, in particular as they pertain to the decomposition of electrolyte. The latter can lead to gas production, which in turn leads to increased battery internal impedance. The battery with this increased battery internal impedance can quickly stray from optimum operating conditions. Additionally, overcharging promotes the growth of dendrites, which in turn leads to battery shorting. On other hand, present demands upon batteries call increasingly for greater power densities, so that undercharge is also to be avoided in any charging scheme.

Silver-based batteries typically have high energy densities, i.e., high energy to weight and volume ratios, an ability to deliver energy at relatively high current drains, and high reliability, making them excellent candidates for use in next generation technologies, as well as meeting current day energy storage and delivery demands. Thus, there is a need for a battery charging method and system that minimizes the deleterious effects of overcharging.

The charging of silver-based batteries is characterized by two plateaus, reflecting the two active oxidation states of silver. The first plateau occurs as silver is transformed to monovalent silver oxide ($Ag_2O$) while the second plateau reflects the formation of divalent silver (AgO). Towards the end of charge, generally at approximately 90% of maximum capacity, the plateau transforms into a steeply rising curve and the battery begins to be overcharged. Consequently, a battery charging method and system that limits the maximum charging voltage and charging current is needed. The battery charging method and system should taper charge the battery, so as not to drive too much energy into the battery too fast, and, thus, prevent damage to the battery. Gassing, which damages the battery, should be minimized.

With the advent of more sophisticated and expensive battery systems, such as silver-based batteries and other high impedance batteries, the need arises for more advanced charging methods and systems, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging method and system should be inexpensive, easy to manufacture and use, small and light weight, durable, long lasting, reliable, and capable of being used in aerospace and defense applications.

Different battery charging methods and system have heretofore been known. However, none of these battery charging methods and system satisfies these aforementioned needs.

Different charging methods and system, using shunt regulators have been disclosed.

U.S. Pat. No. 5,821,733 (Turnbull) and U.S. Pat. No. 5,747,964 (Turnbull) disclose rechargeable batteries and battery charging systems for multiple series connected battery cells which include a plurality of shunt regulators, adapted to be connected in parallel with each of the cells. The voltage of each cell is monitored during charging. When a cell is fully charged, excess charging current is shunted around the fully charged cell to enable the remaining cells to continue to charge. Turnbull shows different embodiments of his shunt regulators. In one of Tunrbull's embodiments, Turnbull simply shows shunt regulators, each in parallel with a battery cell. In another embodiment, Turnbull uses shunt regulators and field effect transistors, whose drain and source terminals are connected in parallel across each of the battery cells. Each shunt regulator is under the control of a voltage sensing circuit, which includes a differential amplifier which senses the actual cell voltage of the battery cell and compares it with a reference voltage, elsewhere in the charging circuit. In yet another embodiment, Turnbull uses a plurality of isolation switches to disconnect the battery cells from the charging circuit to prevent the battery circuit from discharging the cells when the battery charger is not being used.

U.S. Pat. No. 5,982,144 (Johnson et al) discloses a rechargeable power supply overcharge protection circuit with shunt circuits that shunt current about a battery or battery cell of a string of battery cells, when it is charged to a maximum charge limit. The shunt circuit includes shunt regulators connected across each battery cell.

U.S. Pat. No. 6,025,696 (Lenhart et al) discloses a battery cell bypass module having a sensor for detecting an operating condition of a battery cell, such as voltage or temperature, and a controller connected across the battery cell of a lithium ion battery, the controller then being operable to change to the conductive mode and thereby shunt current around the battery cell. The controller includes a voltage limiting operational amplifier operable for transmitting a voltage excessive output signal, when the input thereto exceeds a predetermined value, and a transistor having a predetermined gate voltage allowing bypass current flow, the transistor being responsive to the voltage excessive output signal from the voltage limiting operational amplifier to shunt current around the battery cell.

U.S. Pat. No. 4,719,401 (Altmejd) discloses zener diodes, each of which are shunted across each cell in a series connected string of battery cells.

Different charging methods and systems, using plateaus and inflection points have been disclosed.

U.S. Pat. No. 5,642,031 (Brotto) discloses a battery recharging system with state of charge detection, that initially detects whether a battery to be charged is already at or near full charge to prevent overcharging. A state of charge test is first performed on the battery, by applying a current pulse and then observing the voltage decay characteristics which result, batteries which are initially nearly fully charged exhibiting a larger voltage decay than batteries which are not as fully charged. The result of this initial state of charge test is used to determine how to best terminate battery charging.

U.S. Pat. No. 4,392,101 (Saar et al) and U.S. Pat. No. 4,388,582 (Saar et al) disclose a method and apparatus of fast charging batteries by means of analysis of the profile of the variation with time of a characteristic of the battery, which is indicative of the variation in stored chemical energy as the battery is charged. The method comprises analyzing the profile for the occurrence of a particular series of events, preferably including one or more inflection points, which identify the point in time at which the application of a fast charge rate should be discontinued. Additional methods of analysis provide for termination or control of the charging current, upon the occurrence of other events such as limiting values on time, voltage or voltage slope, or a negative change in the level of stored energy. The variation of the characteristic with time is analyzed, preferably by measuring successive values of the characteristic, computing the slope and comparing successive slope values so as to identify inflection points and other significant events in the variation of the characteristic. Apparatus for performing these methods comprises a power supply and a microcomputer for analyzing the profile and controlling the power supply.

Saar and Brotto show a voltage-time curve, which can be separated into at least four distinct regions. Region I represents the beginning of the charging sequence just after the battery is initially attached to the charger and the charging begins. After the charging sequence passes through region I, the charging curve will enter a more stable region II. Region II is generally the longest region of the charging sequence, and is marked by most of the internal chemical conversion within the battery itself. Because of this, the voltage of the battery does not substantially increase over region II, and thus, this region represents a plateau region in the charging curve. At the end of region II is an inflection point in the curve, which represents a transition from region II to region III, and is noted by a point where the slope of the curve changes from a decreasing rate to an increasing rate. Region III is the region in which the battery voltage begins to increase rapidly with respect to time, thus, representing a region of rapid voltage rise. As the battery voltage increases through region III to its fully charged condition, the internal pressure and temperature of the battery also increases. When the effects of temperature and pressure within the battery begin to take over, the increase in battery voltage begins to taper off. This tapering off effect is noted as another inflection point and is also characterized by the sharp fall in the voltage derivative curve dV/dt. Region IV represents the fully charged region following the latter inflection point and including the charge termination target. The charging voltage only stabilizes at the charge termination target for a very short period of time. Consequently, if charging continues, the additional heating within the battery will cause the voltage of the battery to decrease and in addition may cause damage to the battery.

U.S. Pat. No. 6,215,312 (Hoenig et al) discloses a method and apparatus for analyzing an AgZn battery, which diagnoses the status of the battery having high and low voltage plateau states corresponding to its state of charge.

Other fast charging devices and methods have been disclosed, some of which are complicated and involved.

U.S. Pat. No. 5,307,000 (Podrazhansky et al) discloses a method and apparatus, which uses a sequence of charge and discharge pulses. The discharging pulses preferably have a magnitude, which is approximately the same as the magnitude of the charging pulses, but which have a duration which is substantially smaller than the duration of the charging pulses. The discharging pulse causes a negative-going spike, which is measured and prompts the charging to stop.

U.S. Pat. No. 6,097,172 (Podrazhansky et al) discloses an apparatus and method for charging a battery in a technique wherein charge pulses are followed by discharge pulses and then first rest periods and other discharge pulses followed by second rest periods. Selected ones of the second rest periods are extended in time to enable a battery equilibrium to be established and the open circuit voltage of the battery to settle down and reflect an overcharging condition of the battery. By comparing the open circuit voltages measured during different extended second rest periods small voltage decreases are detected and used to determine an overcharging condition, such as when gases are generated and affect the open circuit voltage. Once overcharging is detected the battery charging is stopped. U.S. Pat. No. 6,232,750 (Podrazhansky et al) also discloses another battery charger, which rapidly charges a battery utilizing a bipolar waveform.

U.S. Pat. No. 5,204,611 (Nor et al) and U.S. Pat. No. 5,396,163 (Nor et al) disclose circuits in which rechargeable batteries and cells are fast charged by a controlled current, and substantially at a rate not exceeding the ability of the battery or cell to accept current. The resistance free terminal voltage of the battery or cell is detected during an interval when the charging current is interrupted, and compared against an independent reference voltage to control the charging current when a difference between the reference voltage and the sensed resistance free terminal voltage exists.

Different charging methods and systems, using time as a factor in charging have been disclosed.

U.S. Pat. No. 6,137,268 (Mitchell et al) discloses a battery charging system in which current is averaged over a long time period (seconds) to determine the maximum average charging rate. When the integral of charging current over this long time period reaches the programmed maximum charge value for one period, current is simply cut off for the remainder of the fixed long period.

U.S. Pat. No. 6,215,291 (Mercer) discloses a control circuit, having a bandgap reference circuit, which minimizes the charging cycle time of a battery charging system, by maximizing the length of time that high constant charging current is applied to a discharged battery.

Other charging devices, batteries, and methods have been disclosed, which still do not satisfy the aforementioned needs.

U.S. Pat. No. 5,166,596 (Goedken) discloses a battery charger having a variable-magnitude charging Current Source. U.S. Pat. No. 6,222,343 (Crisp et al) discloses a battery charger, which is capable of charging different types of batteries, a method for charging a battery, and a software program for operating the battery charger.

U.S. Pat. No. 5,387,857 (Honda et al); U.S. Pat. No. 5,438,250 (Retzlaff); U.S. Pat. No. 5,994,878 (Ostergaard et al); U.S. Pat. No. 6,037,751 (Klang); U.S. Pat. No. 5,089,765 (Yamaguchi); U.S. Pat. No. 4,113,921 (Goldstein et al); U.S. Pat. No. 5,049,803 (Palanisamy) U.S. Pat. Nos. 5,160,880 6,124,700 (Nagai et al); (Palanisamy) U.S. Pat. No. 4,745,349 (Palanisamy); U.S. Pat. No. 5,721,688, (Bramwell); U.S. Pat. No. 6,252,373 (Stefansson); U.S. Pat. No. 5,270,635 (Hoffman et al); U.S. Pat. No. 6,104,167 (Bertness et al); U.S. Pat. No. 3,708,738 (Crawford et al); British Patent Nos. GB2178608A (Yu Zhiwei) and 892,954 (Wolff); World Patent Nos. WO00/14848 (Simmonds) and WO01/47086 (Gabehart et al); French Patent No. FR2683093-A1 (Michelle et al); and European Patent Application No. EP1076397A1 (Klang) each disclose other devices, batteries, and methods, which do not satisfy the aforementioned needs.

For the foregoing reasons, there is a need for a battery charging method and system that minimizes the deleterious effects of overcharging and, thus, increases battery performance and life is needed. The battery charging method and system should be capable of charging one or more batteries simultaneously, evaluate the state of charge of the batteries, i.e., whether the batteries are substantially charged or substantially fully depleted early during the charging cycle, and charge the batteries accordingly, based upon such state of charge. The charging method and system should limit the maximum charging voltage and charging current applied to the battery, and should taper charge the battery, so as not to drive too much energy into the battery too fast, and, thus, prevent damage to the battery. Gassing, which damages the battery, should be minimized. With the advent of more sophisticated and expensive battery systems, such as silver-based batteries and other high impedance batteries, the need arises for more advanced charging methods and systems, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging method and system should be inexpensive, easy to manufacture and use, small and light weight, durable, long lasting, reliable, and capable of being used in aerospace and defense applications.

SUMMARY

The present invention is directed a battery charging method and system that minimizes the deleterious effects of overcharging, thus, increases battery performance and life is needed. The battery charging method and system is capable of charging one or more batteries simultaneously, evaluating the state of charge of the batteries, i.e., whether the batteries are substantially charged or substantially fully depleted early during the charging cycle, and charging the batteries accordingly, based upon such state of charge. The charging method and system limits the maximum charging voltage and charging current applied to the battery, and taper charges the battery, so as not to drive too much energy into the battery too fast and, thus, preventing damage to the battery. Gassing, which damages the battery, is minimized. With the advent of more sophisticated and expensive battery systems, such as silver-based batteries and other high impedance batteries, the need arises for more advanced charging methods and systems, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging method and system of the present invention limits the maximum charging voltage and charging current applied to the battery, and taper charges the battery, is additionally inexpensive, easy to manufacture and use, small and light weight, durable, long lasting, reliable, and capable of being used in aerospace and defense applications, and satisfies the aforementioned needs.

A battery charging method having features of the present invention comprises: charging at least one battery at a first voltage for a first time duration; charging the batteries at a second voltage for a second time duration; determining state of charge of the batteries at the end of the second time duration; if the batteries are not substantially fully charged at the end of the second time duration, the total charging time is evaluated to determine if the batteries have been charged for a time duration greater than or equal to a third time duration, and if the total charging time has not exceeded or is not equal to the third time duration, charging the batteries at the first voltage for the first time duration and charging the batteries at the second voltage for the second time duration is repeated; if the batteries are substantially fully charged at the end of the second time duration, battery charging is ceased; or if the total charging time has exceeded or is equal to the third time duration at the end of the second time duration, battery charging is ceased.

A battery charging system having features of the present invention comprises: a current source; a cutoff voltage controller and timer; at least one battery; respective ones of voltage and current regulators, which regulate voltages applied to each of the respective ones of the batteries and current supplied to each of the respective ones of the batteries; the cutoff voltage controller and timer controlling the voltages and controlling time durations of the voltages applied to each of the respective ones of the batteries therethrough control of the voltage and current regulators; current sensing means, which senses current flowing therethrough the batteries, the sensed current communicated thereto the cutoff voltage controller and timer; and a system voltage and current regulator, which shunts current from the batteries.

DRAWINGS

These and other features, aspects, and advantages of the present invention will become better understood with regard to the following description, appended claims, and accompanying drawings where:

DESCRIPTION

The preferred embodiments of the present invention will be described with reference to FIGS. 1–9 of the drawings. Identical elements in the various figures are identified with the same reference numbers.

Figure 1:
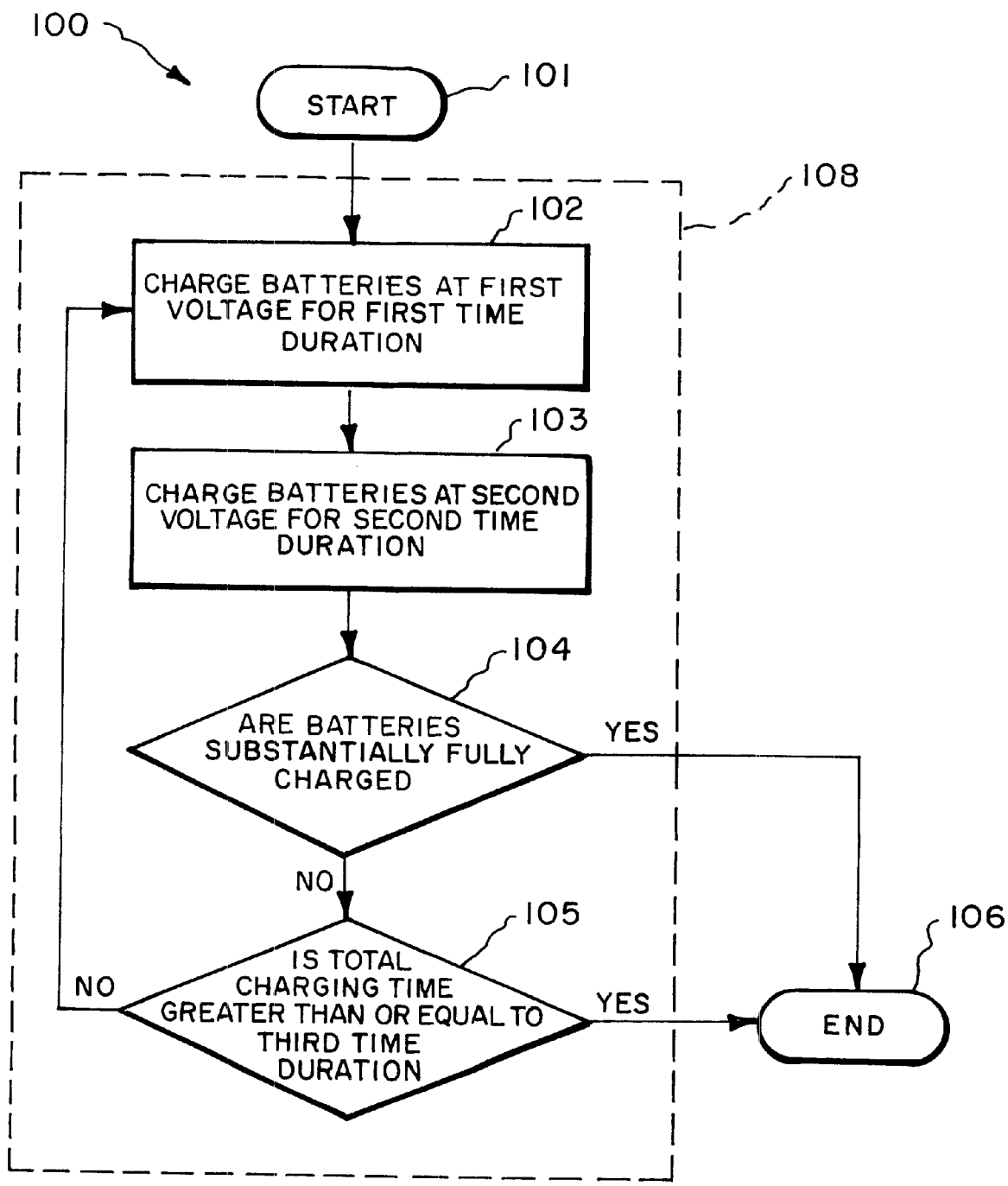
FIG. 1 is a schematic representation of steps of a battery charging method of the present invention.

FIG. 1 shows steps of a method of charging batteries 100 of the present invention. The method of charging batteries 100 starts at step 101. Batteries to be charged are charged at a first voltage for a first time duration at step 102. The batteries are then charged at a second voltage for a second time duration, at step 103. At the end of the second time duration, the batteries are evaluated to determine state of charge, i.e., whether the batteries are substantially fully charged, at step 104. If the batteries are determined to be not substantially fully charged at the end of the second time duration, at step 104, the total charging time is evaluated to determine if the batteries have been charged for a time duration greater than or equal to a third time duration, at step 105. If the batteries are determined to be substantially fully charged at the end of the second time duration, at step 104, battery charging is ceased and the method of charging batteries 100 ends at step 106.

If the total charging time has not exceeded or is not equal to the third time duration, at step 105, another charging cycle 108, which has the steps 102, 103, 104, and 105, may be repeated, as required, until the total charging time has exceeded or is equal to the third time duration at step 105, and/or the steps 102, 103, and 104 may be repeated until the batteries are determined be substantially fully charged at step 104.

If the total charging time has exceeded or is equal to the third time duration at step 105, battery charging is ceased and the method of charging batteries 100 ends at step 106.

The batteries may, thus, be charged again at the first voltage for the first time duration at step 102 and again at the second voltage for the second time duration, at step 103. The batteries are then evaluated again to determine the state of charge, i.e., whether the batteries are substantially fully charged, at step 104. If the batteries are again determined to be not substantially fully charged at the end of the second time duration, at step 104, the total charging time is again evaluated to determine if the batteries have been charged for the time duration greater than or equal to the third time duration, at step 105, and if the batteries are determined to be substantially fully charged at the end of the repeated second time duration, at step 104, battery charging is ceased and the method of charging batteries 100 ends at step 106. If the total charging time has not exceeded or is not equal to the third time duration, again at step 105, the charging cycle 108 may be repeated again, and/or the steps 102, 103, and 104 may be repeated until the batteries are determined be substantially fully charged at step 104.

The charging cycle 108 having the steps 102, 103, 104, and 105 may be repeated as many times as necessary, until the charging time is greater than or equal to the third time duration, and/or until the batteries are determined be substantially fully charged at step 104, after steps 102, and 103 have been completed.

Figure 2:
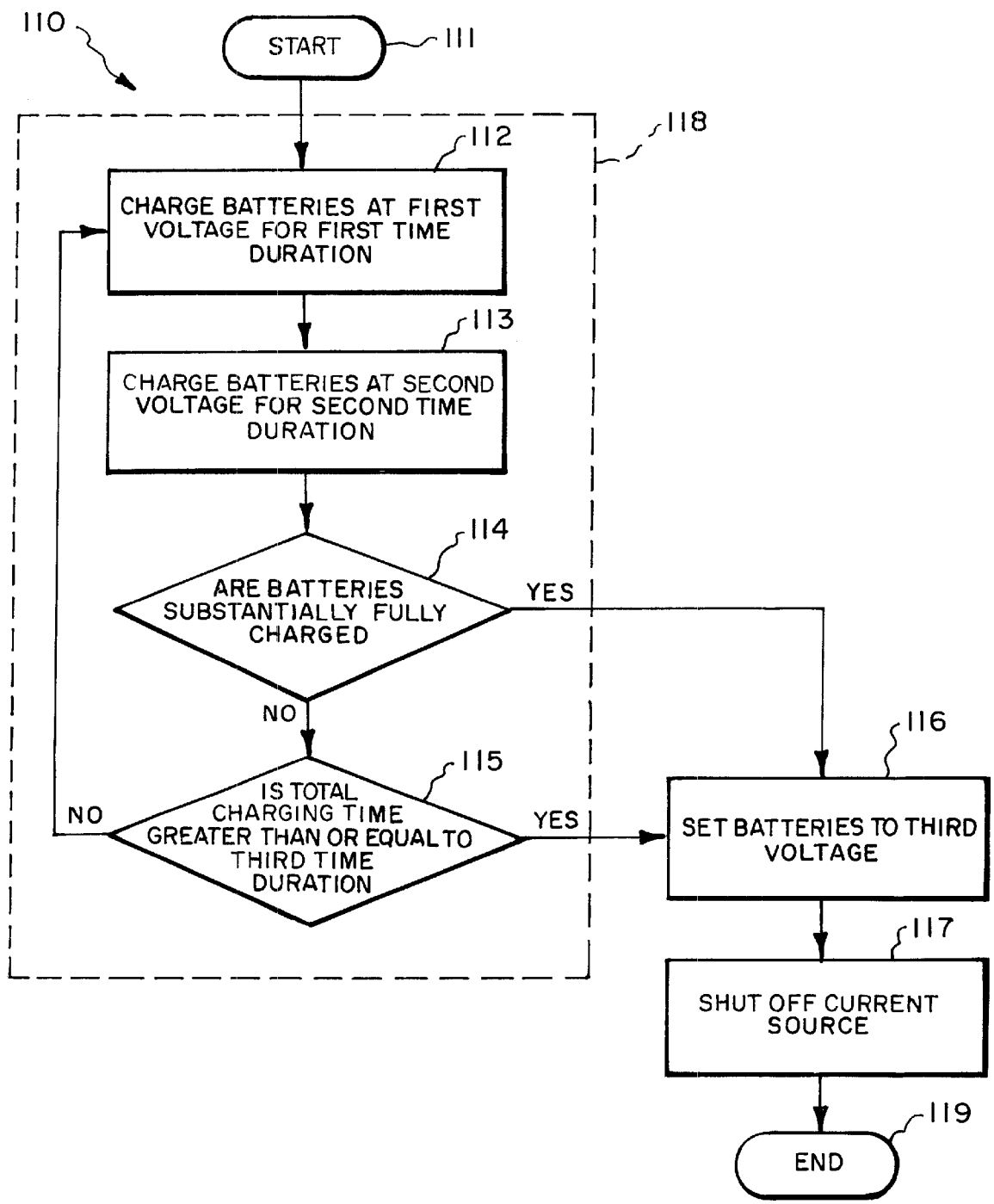
FIG. 2 is a schematic representation of steps of an alternate battery charging method of the present invention.

FIG. 2 shows steps of an alternate method of charging batteries 110 of the present invention, which is substantially the same as the method of charging batteries 100, except that the batteries are set to a third voltage prior to shutting off the current source in the method of charging batteries 110.

The method of charging batteries 110 starts at step 111. Batteries to be charged are charged at a first voltage for a first time duration at step 112. The batteries are then charged at a second voltage for a second time duration, at step 113. At the end of the second time duration, the batteries are evaluated to determine state of charge, i.e., whether the batteries are substantially fully charged, at step 114. If the batteries are determined to be not substantially fully charged at the end of the second time duration, at step 114, the total charging time is evaluated to determine if the batteries have been charged for a time duration greater than or equal to a third time duration, at step 115. If the batteries are determined to be substantially fully charged at the end of the second time duration, at step 114, the batteries are set to a third voltage at step 116. Battery charging is, then, ceased, i.e., the current source is shut off, at step 117, and the method of charging batteries 110 ends at step 119.

If the total charging time has not exceeded or is not equal to the third time duration, at step 115, another charging cycle 118, which has the steps 112, 113, 114, and 115, may be repeated, as required, until the total charging time has exceeded or is equal to the third time duration at step 115, and/or the steps 112, 113, and 114 may be repeated until the batteries are determined be substantially fully charged at step 114.

If the total charging time has exceeded or is equal to the third time duration, at step 115, the batteries are set to the third voltage, at step 116. Battery charging is, then, ceased, i.e., the current source is shut off, at step 117, and the method of charging batteries 110 ends at step 119.

The batteries may, thus, be charged again at the first voltage for the first time duration at step 112 and again at the second voltage for the second time duration, at step 113. The batteries are then evaluated again to determine the state of charge, i.e., whether the batteries are substantially fully charged, at step 114. If the batteries are again determined to be not substantially fully charged at the end of the second time duration, at step 114, the total charging time is again evaluated to determine if the batteries have been charged for the time duration greater than or equal to the third time duration, at step 115, and if the batteries are determined to be substantially fully charged at the end of the repeated second time duration, at step 114, the batteries are set to a third voltage, at step 116. Battery charging is, then, ceased, i.e., the current source is shut off at step 117, and the method of charging batteries 110 ends at step 119. If the total charging time has not exceeded or is not equal to the third time duration, again at step 115, the charging cycle 118 may be repeated again, and/or the steps 112, 113, and 114 may be repeated until the batteries are determined be substantially fully charged at step 114.

The charging cycle 118 having the steps 112, 113, 114, and 115 may be repeated as many times as necessary, until the charging time is greater than or equal to the third time duration, and/or until the batteries are determined be substantially fully charged at step 114, after steps 112, and 113 have been completed.

Figure 3:
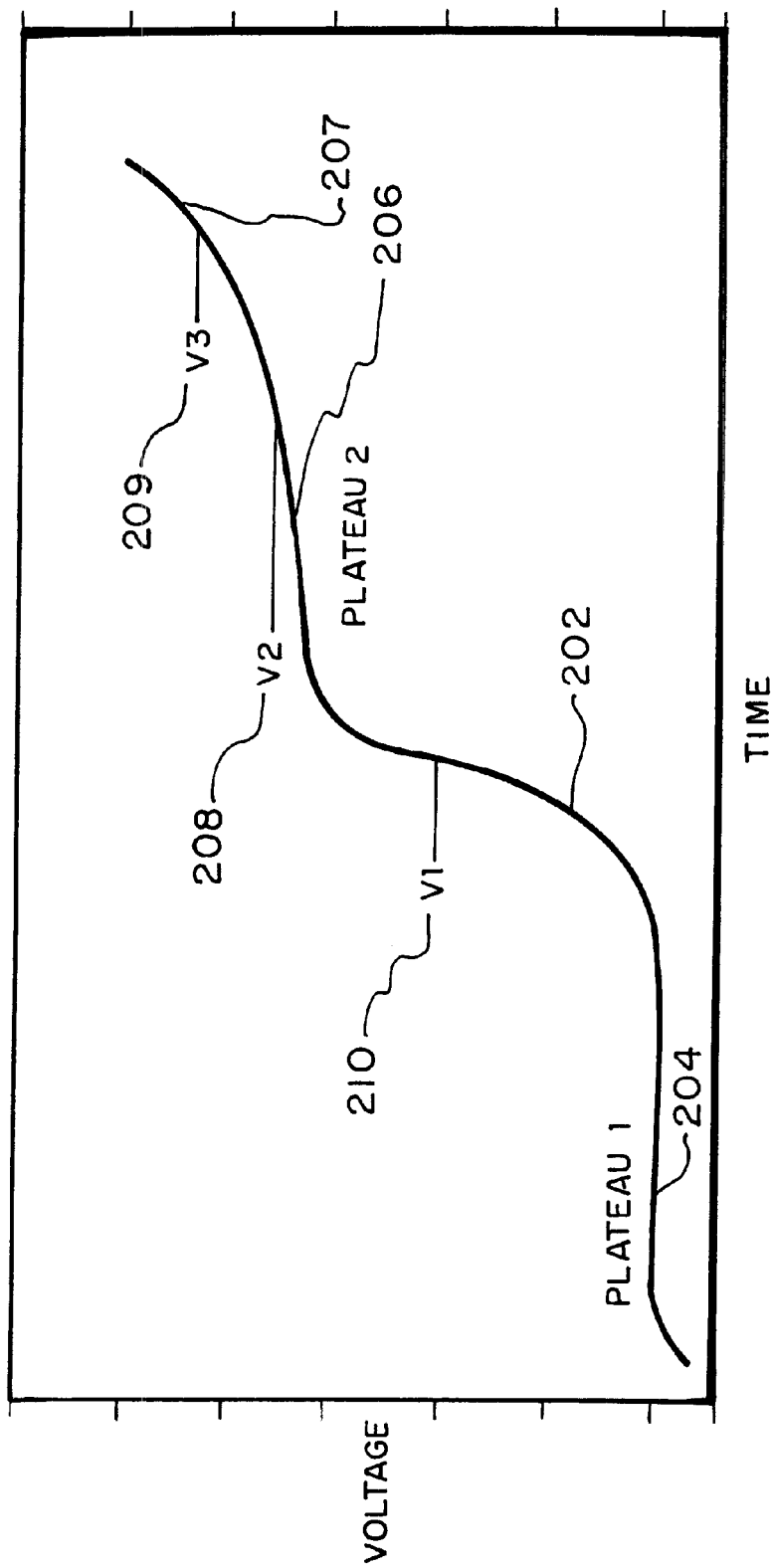
FIG. 3 is a graphical representation of a battery charging profile.

FIG. 3 shows a typical charging profile 202 of a silver-based battery, illustrating battery voltage as a function of time, during charging, reflecting the two active oxidation states of silver. Silver-based batteries typically have two plateaus. The first plateau 204, called the "plateau region," occurs as silver is transformed to monovalent silver oxide ($Ag_2O$), and typically has less than 4% voltage variation per 10% change in battery capacity. Silver in the battery is converted to monovalent silver oxide within the "plateau region." As the battery is charged further, the battery reaches a second plateau 206, which indicates formation of a divalent silver species (AgO). Towards the end of charge, generally at approximately 90% of maximum capacity, the plateau transforms into a steeply rising curve 207, and the battery begins to be overcharged. Other plateaus may exist depending on battery chemistry and other parameters.

The following empirical observations are presented herewith and disclosed as relevant and part of the teachings of the present invention, and are applicable to the method of charging batteries 100 of the present invention, shown in FIGS. 1 and 2. These empirical observations are particularly relevant to silver based batteries.

The total time required to charge a silver based battery may be defined as $T_{total}=C/Ic$, where C is the capacity of the battery, and Icc is the value of the charging current supplied to the battery. The total time $T_{total}$ may be defined as having time durations, such as, for example, at least one first time duration T1, and at least one second time duration T2, where charge is applied to the battery at least one or more times for the first time duration T1 and the second time duration T2. The first time duration T1 may be defined as the time duration from commencement of charging at a first voltage. The second time duration T2 may be defined as the time duration from the end of the first time duration T1, while charging at a second voltage. The total time $T_{total}$ required to charge the battery is, thus, for example, a constant times the sum of the first time duration T1 and the second time duration T2, where k may be defined as the constant, which is greater than or equal to 1, such that the total time $T_{total}=k(T1+T2)$.

Further to the above empirical observations and teachings of the present invention, battery charging may be optimized:

1) by charging for the first time duration T1 at the first voltage, which is substantially equal to Voltage V2 (208), which is a voltage substantially at the second plateau, typically prior to the steeply rising curve 207 of the charging profile 202, the time duration T1 being defined as $T1=\xi*C/Ic$, where $0.02<\xi<0.06$;

2) by charging for the second time duration T2 at the second voltage, which is substantially equal to Voltage V3 (209), which is a voltage slightly above the second plateau, typically at the knee of the steeply rising curve 207 of the charging profile 202, the time duration T2 being defined as $T2=\beta*C/Ic$, where $3\times10^{-5}<\beta<3\times10^{-3}$.

Further to the above empirical observations and teachings of the present invention, battery charging may be further enhanced:

by setting the batteries to a third voltage, which is substantially equal to Voltage V1 (210), which is a voltage between the first plateau 204 and the second plateau 206 of the charging profile 202, and ceasing battery charging therafter.

The methods of charging batteries 100 and 110 of the present invention may, thus, be optimized and enhanced for silver zinc batteries by using the above disclosed values.

The steps of the methods of charging batteries 100 and 110 of the present invention may be controlled by a cutoff voltage controller, which may be a microcontroller, a computer, or other suitable device.

Figure 4:
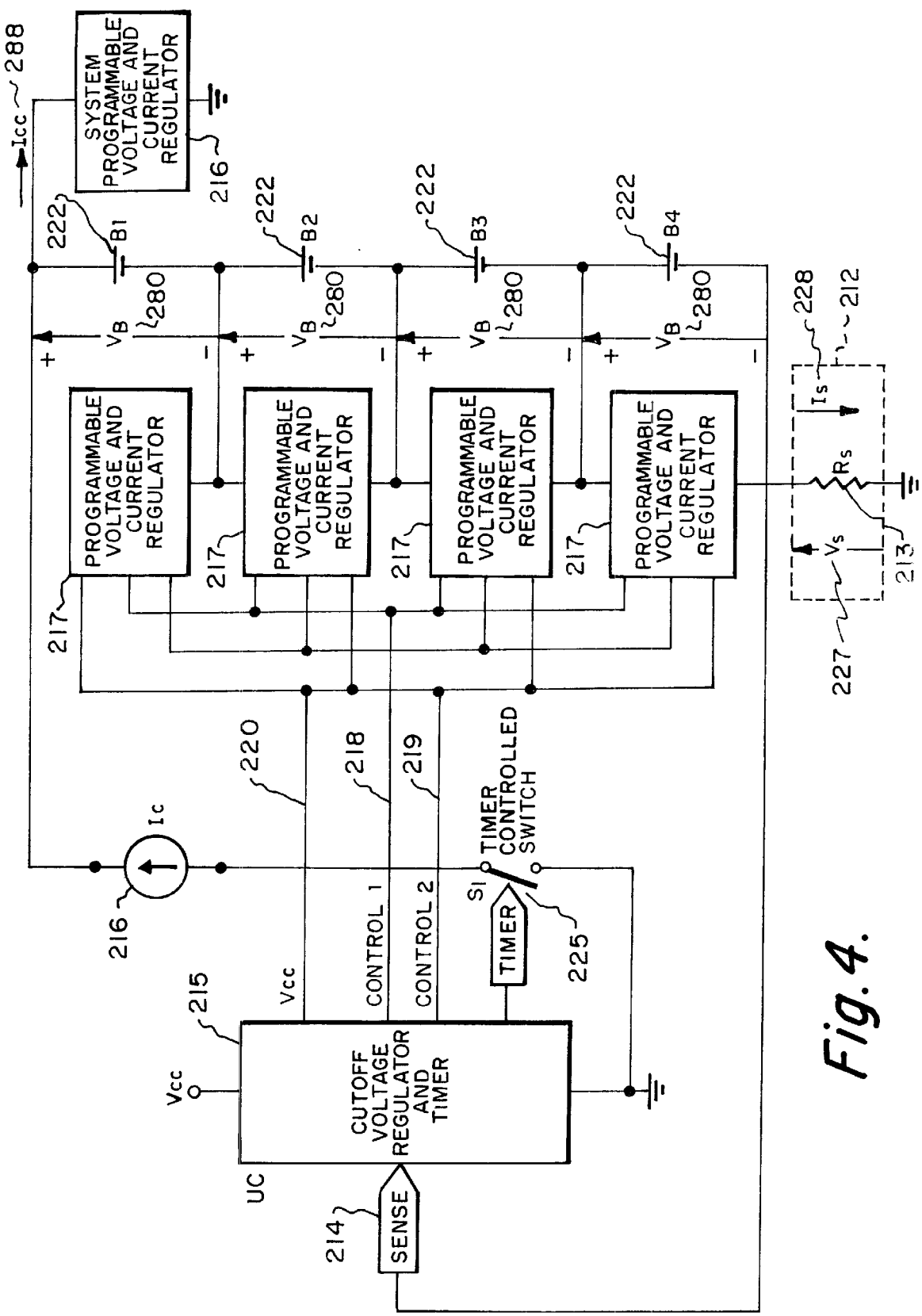
FIG. 4 is a block diagram of a battery charging system, constructed in accordance with the present invention.

FIG. 4 shows a block diagram of an embodiment of the present invention, a battery charging system 211, which is different from the battery charging system 400 of copending application, entitled "Battery Charging System," by inventors Michael Cheiky and Te-Chien Felix Yang, serial number to be determined, filed Dec. 14, 2001, referenced above, i.e., the battery charging system 211 of the present invention has current sensing means 212, which may be a resistor $R_S$ (213), sensed current input 214 from the current sensing means 212 to cutoff voltage controller and timer 215, which may be a microcontroller, and system programmable voltage and current regulator 216. Each programmable voltage and current regulator 217 of the battery charging system 211 of the present invention may have Control 1 voltage inputs 218, Control 2 voltage inputs 219, and voltage reference inputs $V_{cc}$ (220), which may be derived by the cutoff voltage controller and timer 215.

The battery charging system 211 of the present invention regulates voltage applied to each of batteries B1 (222) and regulates, shapes, and shunts current supplied to each of the batteries B1 (222) at appropriate voltages via the use of the programmable voltage and current regulators 217, while in series and without disconnecting batteries B1 (222) from the battery charging system 211.

The battery charging system 211 may have a plurality of cutoff voltages, which may be input into the Control 1 voltage inputs 218, the Control 2 voltage inputs 219, and the voltage reference inputs $V_{cc}$ (220), depending on the number of plateaus that are selected to be regulated and the types of the batteries B1 (222), which to be charged. The batteries B1 (222) may be the same and/or different types of batteries, having the same and/or different characteristics. The batteries B1 (222), thus, may have the same and/or different electrical characteristics chemical characteristics, and/or physical characteristics. The battery charging system 211 may have a plurality of the batteries B1 (222) to be charged and a plurality of the programmable voltage and current regulators 217.

Timer controlled switch S1 (225), which may be controlled by the cutoff voltage controller and timer 215 is in series with Current Source $I_C$ (226), a plurality of the batteries B1 (222) which are in series, and a plurality of the programmable voltage and current regulators 217 which are in series. Each respective one of the programmable voltage and current regulators 217, across a respective one of the batteries B1 (222), regulates voltage applied to and current supplied to each of the respective ones of the batteries B1 (222). Each of the programmable voltage and current regulators 217 may be individually programmed to accept a variety of charging methods and processes.

The current sensing means 212, which is in series with the batteries B1 (222), senses Sense Current $I_S$ 228 flowing through the batteries B1 (222), which are in series. Sense Voltage $V_S$ (227) generated across the current sensing means 212, which may be the resistor $R_S$ (213), is communicated, as sensed current input 214 from the current sensing means 212, to the cutoff voltage controller and timer 215, which may be a microcontroller. The Sense Current $I_S$ 228 is a measure of the current flowing from the Current Source $I_C$ (226) therethrough the batteries B1 (222). The cutoff voltage controller and timer 215 may use the sensed current input 214 to determine the state of charge and other battery characteristics of the batteries B1 (222), and to control operation of the battery charging system 211.

As the batteries B1 (222) approach full charge, current is shunted therethrough the system programmable voltage and current regulator 216, and away from the batteries B1 (222), thus, further minimizing the possibility of overcharging the batteries B1 (222).

Figure 5:
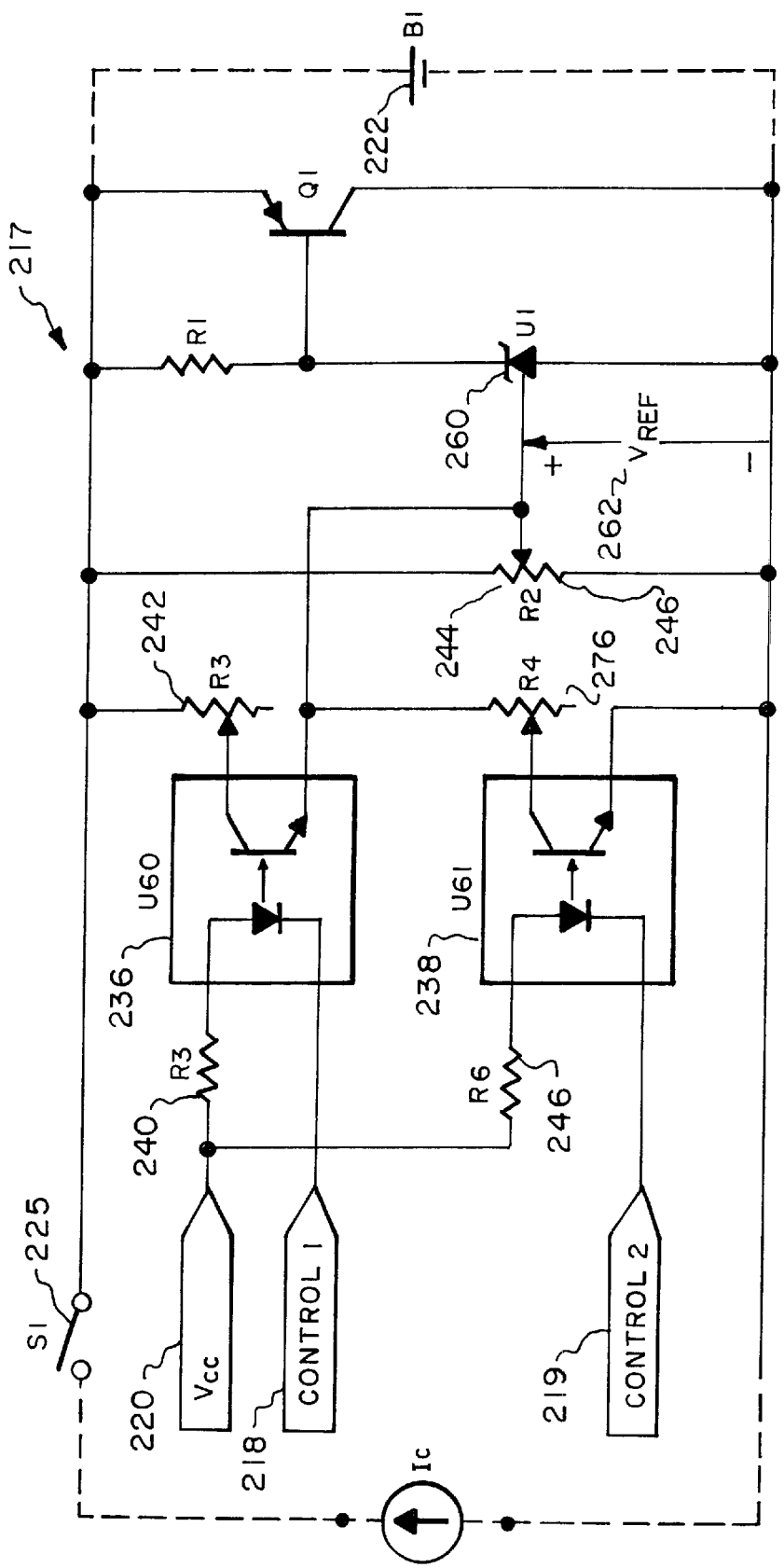
FIG. 5 is a schematic diagram of a programmable voltage and current regulator, constructed in accordance with the present invention.

FIG. 5 shows a typical one of the programmable voltage and current regulator 217, although other suitable programmable voltage and current regulators may be used. The programmable voltage and current regulator 217, has a plurality of the cutoff voltages inputs, shown as the Control 1 voltage input 218, the Control 2 voltage input 219, the voltage reference input $V_{cc}$ (220), and optoisolators. Optoisolators U60 (236) and U62 (238) are shown in FIG. 5. The number of cutoff voltages may be increased by simply adding additional optoisolators, accompanying resistors and potentiometers, and calibrating the programmable voltage and current regulator 217, accordingly. The number of cutoff voltages of each of the programmable voltage and current regulators 217 is one more than the number of optoisolators used in each of the programmable voltage and current regulators 217.

The current that arises from a voltage difference between the voltage at the Control 1 voltage input 218 and the voltage reference input $V_{cc}$ (219) flows through limiting resistor R5 (240), which activates the optoisolator U60 (236), and results in potentiometer resistor R3 (242) being in parallel with upper portion 244 of potentiometer resistor R2 (246). The potentiometer resistor R3 (242) has a large resistance compared with the resistance of the upper portion 244 of the resistor R2 (246). The effective resistance coupled to adjustable band-gap voltage reference diode U1 (260) is reduced, thus providing an offset to zener reference voltage $V_{REF}$ (262) of the adjustable band-gap voltage reference diode U1 (260). Likewise, current that arises from a voltage difference between the voltage at the Control 2 voltage input 219 and the voltage reference input $V_{cc}$ (219) flows through limiting resistor R6 (264), which activates the optoisolator U62 (238), and results in potentiometer resistor R4 (276) being in parallel with the lower portion 244 of the potentiometer resistor R2 (246). The potentiometer resistor R4 (276) has a large resistance compared with the resistance of the lower portion 244 of the resistor R2 (246). The effective resistance coupled to the adjustable band-gap voltage reference diode U1 (260) is reduced, thus providing an offset to zener reference voltage $V_{REF}$ (262) of the adjustable band-gap voltage reference diode U1 (260). Consequently, depending on the value of the voltages at the Control 1 voltage input 218, and the Control 2 voltage input 219, three cutoff voltages may be used in the battery charging system 211.

The cutoff voltages may be programmed to change as a function of time or may be changed, as a result of other instructions, may have fixed values, or may be changed manually, depending upon the needs of the battery charging system 211. The cutoff voltages may, for example, be set to the voltage V1 (210), between the first plateau 204 and the second plateau 206 of the charging profile 202, the Voltage V2 (208), substantially at the second plateau, typically prior to the steeply rising curve 207 of the charging profile 202, and/or the Voltage V3 (209), slightly above the second plateau, typically at the knee of the steeply rising curve 207 of the charging profile 202. The voltages at the Control 1 voltage inputs 218 and the voltages at the Control 2 voltage inputs 219 of each of the programmable voltage and current regulators 217 of the battery charging system 211 may alternatively be set to different cutoff voltages, depending on the needs of the battery charging system 211 and the types of the batteries B1 (222) being charged.

Figure 6:
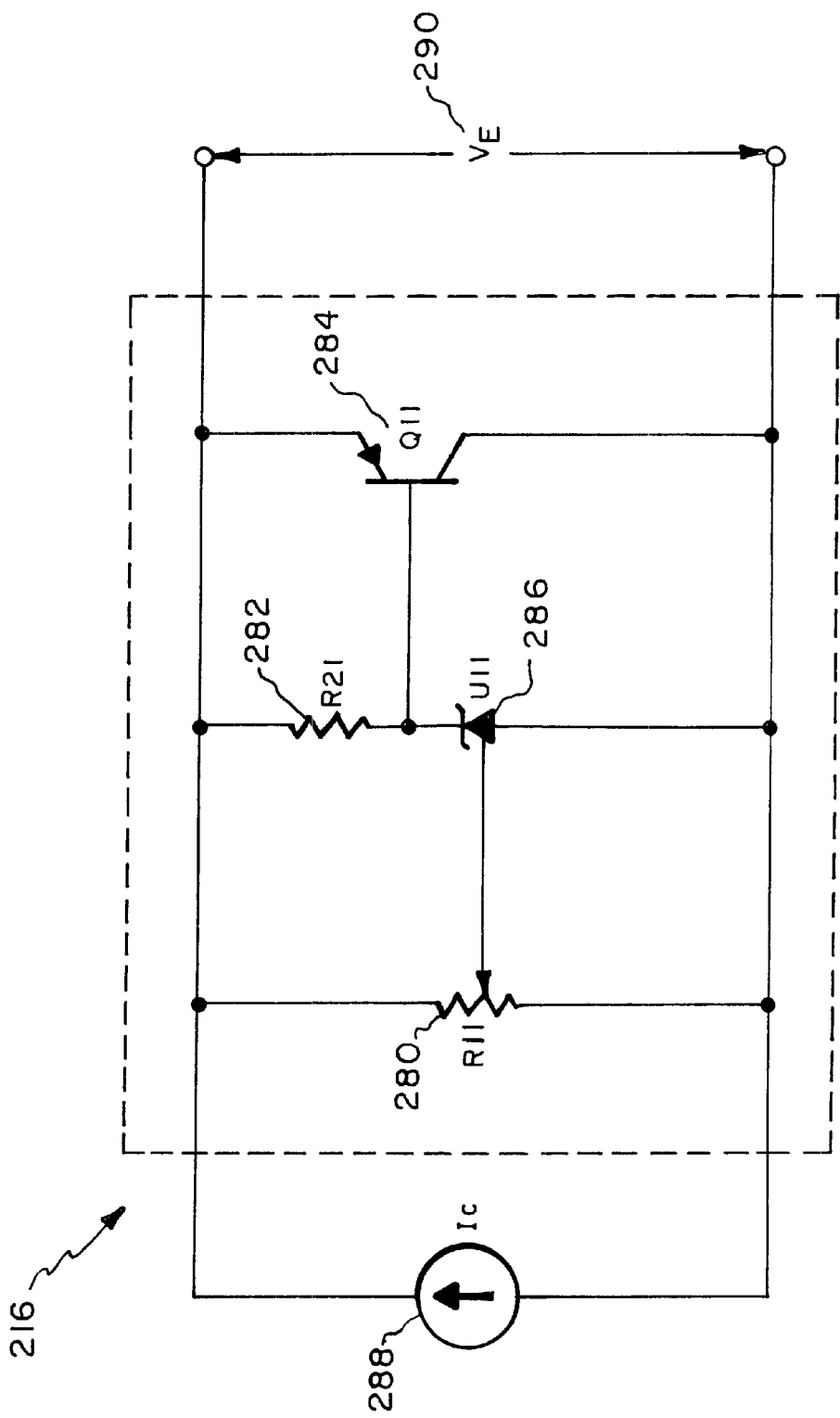
FIG. 6 is a schematic diagram of a system programmable voltage and current regulator, constructed in accordance with the present invention.

FIG. 6 shows a typical system programmable voltage and current regulator 216, although another suitable programmable voltage and current regulator may be used. The system programmable voltage and current regulator 216 has resistor R11 (280), potentiometer R21 (282), transistor Q11 (284), and an adjustable band-gap voltage reference diode U11 (286). Current $I_{CC}$ 288 is shunted therethrough the system programmable voltage and current regulator 216, and away from the batteries B1 (222), thus, minimizing the possibility of overcharging the batteries B1 (222). Voltage $V_E$ (290) is the voltage across the batteries B1 (222) and the current sensing means 212, which are in series.

The programmable voltage and current regulator 217, shown in FIG. 5, and the system programmable voltage and current regulator 216, shown in FIG. 6, are disclosed in copending application, entitled "Battery Charging System," by inventors Michael Cheiky and Te-Chien Felix Yang, serial number to be determined, filed Dec. 14, 2001, although other suitable voltage and current regulators may be used, and are summarized herein below briefly, which will aid in an understanding of various teachings of the present invention.

Further to the above empirical observations and teachings of the present invention, battery charging may be further enhanced:

by shunting current away from the batteries B1 (222), as the batteries B1 (222) become fully charged, such that the Voltage $V_E$ (290) is defined as $V_E <= \mu^* V3 + \eta^* (Ic)_{max} ^* R_S$, where $\mu$ is the number of the batteries B1 (222) being charged, $(Ic)_{max}$ is the charge current when the batteries B1 (222) are fully depleted, $R_S$ is the value of the resistor $R_S$ (213), and $\eta$ is an empirically determnined value between $0.50 < \eta < 0.70$.

Prior to the batteries B1 (222) approaching full charge, the Sense Voltage $V_S$ (227) across the resistor $R_S$ (213) is substantially the product of the source current from the Current Source $I_C$ (226), i.e , $V_S = Ic^* Rs$.

Now, again referring to FIGS. 4–6, each of the programmable voltage and current regulators 217 limits the voltages, or cutoff voltages, to which each of the respective batteries B1 (222) may be charged, and as the batteries B1 (222) approach full charge, current is shunted therethrough the system programmable voltage and current regulator 216, and away from the batteries B1 (222), thus, further minimizing the possibility of overcharging the batteries B1 (222).

The voltages, or cutoff voltages to which the programmable voltage and current regulators are typically set are shown in FIG. 2.

The Voltage V1 (210), for example, may be the voltage between the first plateau 204 and the second plateau 206 of the charging profile 202. For silver-zinc batteries, the voltage V1 (210) is typically in the range of 1.86 to 1.90 volts and is preferably 1.87 volts. For silver-cadmium batteries, the voltage V1 (210) is typically in the range of 1.41 to 1.43 volts, but other suitable values may be used.

The Voltage V2 (208), for example, may be a voltage substantially at the second plateau, typically prior to the steeply rising curve 207 of the charging profile 202. For silver-zinc batteries, the voltage V2 (208) is in the range of 1.95 to 2.03 volts and is preferably 1.97 to 1.98 volts, however, other suitable values may be used. For silver-cadmium batteries, the voltage V2 (208) may be in the range of 1.45 to 1.55 volts, and preferably 1.50 volts, although other suitable values may be used.

The Voltage V3 (209), for example, may be a voltage slightly above the second plateau, typically at the knee of the steeply rising curve 207 of the charging profile 202. For silver-zinc batteries, the voltage V3 (209) is in the range of 2.03 to 2.10 volts and is preferably 2.08 volts, however, other suitable values may be used. For silver-cadmium batteries, the voltage V3 (209) may be in the range of 1.55 to 1.65 volts, although other suitable values may be used.

Figure 7:
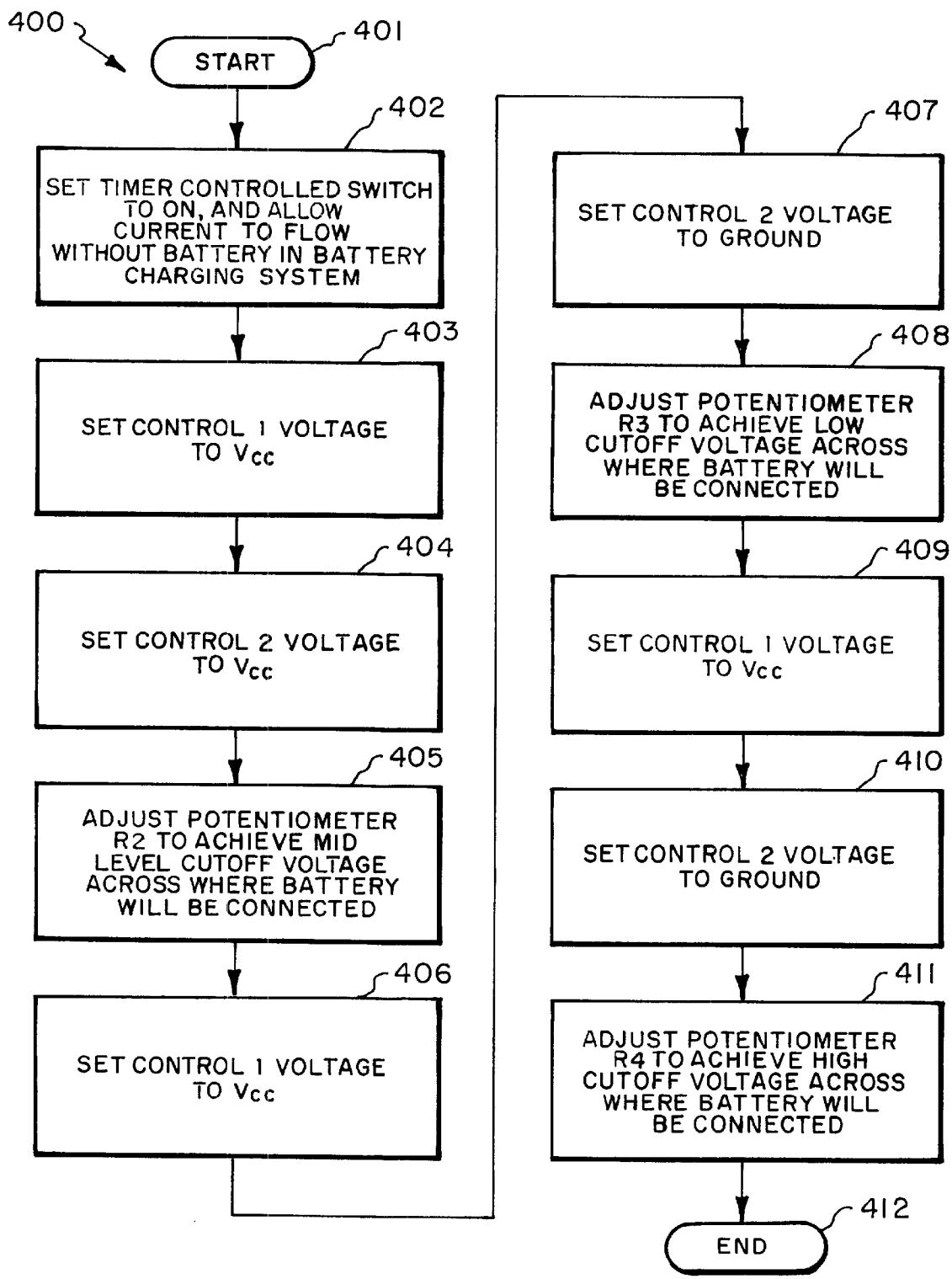
FIG. 7 is a schematic representation of steps of a method of calibrating the programmable voltage and current regulator of FIG. 5.

FIG. 7 shows steps of a method 400 of calibrating each of the programmable voltage and current regulators 217 of FIGS. 4 and 5 for use with three cutoff voltages, i.e., calibrating the Control 1 voltage inputs 218, the Control 2 voltage inputs 219, and the voltage reference inputs $V_{cc}$ (220).

The method 400 of calibrating each of the programmable voltage and current regulators 217 starts at step 401. Current is allowed to flow without the battery B1 (222) in the battery charging system 211 by setting the timer controlled switch S1 (225) to on (step 402); the voltage at the Control 1 voltage input (218) is then set, for example, to the voltage $V_{cc}$ (step 403); the Control 2 voltage input (219) is then set, for example, to ground (step 404); the potentiometer R2 (246) is then adjusted to achieve a mid level cutoff voltage, across where the battery B1 (222) is to be connected (step 405); the voltage at the Control 1 voltage input (218) is then again set to the voltage $V_{cc}$, (step 406); the Control 2 voltage input (219) is then again set to ground (step 407); the potentiometer resistor R3 (242) is then adjusted to achieve a low cutoff voltage, across where the battery B1 (222) will be connected (step 408); the voltage at the Control 1 voltage input (218) is then once again set to the voltage $V_{cc}$ (step 409); the Control 2 voltage input (219) is then once again set to ground (step 410); the potentiometer resistor R4 (276) is then adjusted to achieve a high cutoff voltage, across where the battery B1 (222) will be connected (step 411). The method of calibrating each of the programmable voltage and current regulators 217 ends at step 412, after which the battery B11 (272) may be connected to a respective one of the voltage and current regulators 217.

It should be noted that steps 403 and 404 may alternatively be performed in reverse order or substantially simultaneously. Likewise, steps 406, and 407 may alternatively be performed in reverse order or substantially simultaneously, and steps 409 and 410 may alternatively be performed in reverse order or substantially simultaneously.

The system programmable voltage and current regulator 216 may be calibrated by turning off the Current Source $I_C$ (226), by opening the timer controlled switch S1 (225), disconnecting the system programmable voltage and current regulator 216 from the battery charging system 211, supplying the current $I_{CC}$ 288 thereto the system programmable voltage and current regulator 216, and adjusting the resistor R11 (280) to achieve the Voltage $V_E$ (290) at the output of the system programmable voltage and current regulator 216. The system programmable voltage and current regulator 216 is then reconnected to the battery charging system 211, upon completion of calibration of the system programmable voltage and current regulator 216.

Figure 8:
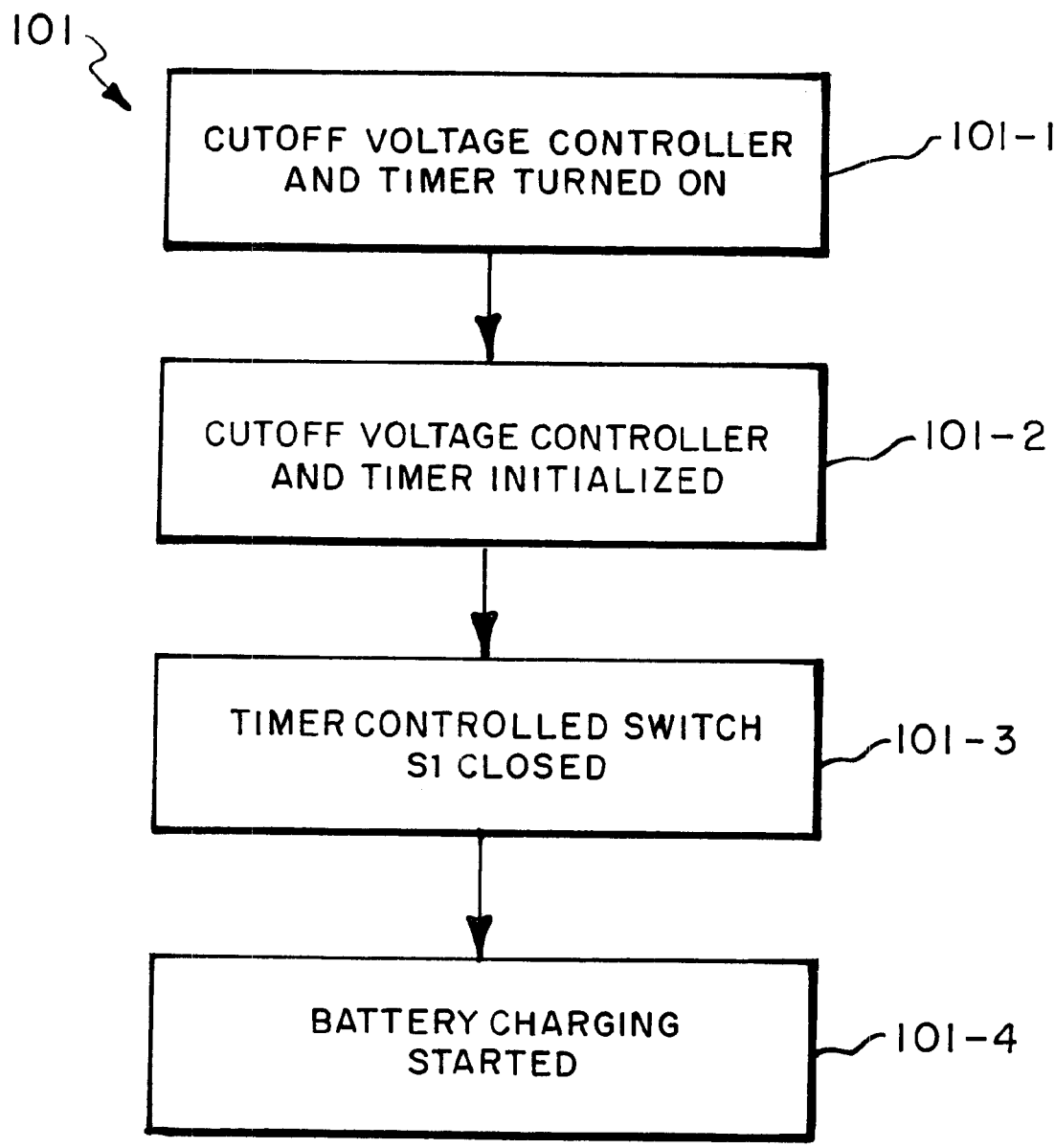
FIG. 8 is a schematic representation of details of a step of the battery charging method of the present invention of FIG. 1.

The batteries B1 (222) may be charged, in accordance with the steps outlined later, and shown in FIGS. 1, 2, and 8: once the method 400 of calibrating each of the programmable voltage and current regulators 217 of FIG. 7, i.e., calibrating the Control 1 voltage inputs (218), the Control 2 voltage inputs (219), the voltage reference inputs $V_{cc}$ (220) of each of the programmable voltage and current regulators 217 is complete, and calibration of the system programmable voltage and current regulator 216 is complete, as described above.

Now, again, as shown in FIG. 3, the timer controlled switch S1 (225), which may be controlled by the cutoff voltage controller and timer 215 is in series with the Current Source $I_C$ (226), a plurality of the batteries B1 (222) which are in series, and a plurality of the programmable voltage and current regulators 217 which are in series. Each respective one of the programmable voltage and current regulators 217, across a respective one of the batteries B1 (222), regulates voltage applied to and current supplied to each of the respective ones of the batteries B1 (222). Each of the programmable voltage and current regulators 217, may be individually programmed to accept a variety of charging methods and processes. It should, thus, be recognized, that each of the batteries B1 (222) may be the same and/or different, i.e. the batteries B1 (222) may of the same and/or different types, and have the same and/or different characteristics, and may be charged using the same and/or different cut off voltages and charging times.

The cutoff voltage controller and timer 215, which may be a microcontroller, may be used to keep track of the time involved in charging the batteries B1 (222), control the timer controlled switch S1 (225), and control the cutoff voltages and the voltage reference input $V_{cc}$ (219) supplied to the programmable voltage and current regulators 217.

The battery charging system 211 of the present invention may perform steps of a process of charging at least one battery. FIGS. 1, 2, and 8 show steps of the method of charging batteries 100 and steps of the method of charging batteries 110 of the present invention, as the method of charging batteries 100 and the method of charging batteries 110 are applied to the battery charging system 211 or other suitable battery charging systems. Certain ones of the steps of the method of charging batteries 100 are broken down into details or smaller steps in FIG. 8, which may be incorporated into the steps of the method of charging batteries 100 and/or the steps of the method of charging batteries 100. The first three numerals of the steps shown in FIG. 8 are associated with the steps with the same numerals in FIG. 1.

Now, again the method of charging batteries 100 starts at step 101. The cutoff voltage controller and timer 215 is turned on at step 101-1, after each of the programmable voltage and current regulators 217 are calibrated, and the system programmable voltage and current regulator 216 is calibrated, as previously described. The cutoff voltage controller and timer 215 is initialized at step 101-2. The cutoff voltage controller and timer 215 sets the Control 1 voltage inputs 218 of each of the programmable voltage and current regulators 217 to the first cutoff voltage, which is the Voltage V2 (208), which is a voltage substantially at the second plateau, typically prior to the steeply rising curve 207 of the charging profile 202, sets the voltage reference input $V_{cc}$ (219) to the programmable voltage and current regulators 217, and starts a timer within the cutoff voltage controller and timer 215, as part of the initialization step 101-2. The cutoff voltage controller and timer 215 then closes the timer controlled switch S1 (225) at step 101-3, which starts current flowing from the Current Source $I_C$ (226), and starts the battery charging system 211 charging the batteries B1 (222) at step 101-4. Charging is started, based upon the aforementioned teachings of the present invention, at the first cutoff voltage Voltage V2 (208).

The batteries B1 (222) are charged at the first voltage being substantially equal to the Voltage V2 (208), which is a voltage substantially at the second plateau, typically prior to the steeply rising curve 207 of the charging profile 202, for the first time duration T1 from the commencement of charging, as T1=$\xi$*C/Ic, where 0.02<$\xi$<0.06, at step 102.

The batteries B1 (222) are then charged at the second voltage, which is substantially equal to the Voltage V3 (209), which is a voltage slightly above the second plateau, typically at the knee of the steeply rising curve 207 of the charging profile 202, the time duration T2 being defined as T2=$\beta$*C/Ic, where $3\times10^{-5}<\beta<3\times10^{-3}$, at step 103. At the end of the second time duration, the batteries are evaluated by the cutoff voltage regulator and timer 215 to determine state of charge, i.e., whether the batteries are substantially fully charged, at step 104, by evaluating the value of the sensed current input 214 from the current sensing means 212, which is a measure of the current flowing from the Current Source $I_C$ (226) therethrough the batteries B1 (222). The cutoff voltage controller and timer 215 uses the sensed current input 214 to determine the state of charge and other battery characteristics of the batteries B1 (222), and to control operation of the battery charging system 211. If the batteries are determined to be not substantially fully charged at the end of the second time duration, at step 104, the total charging time is evaluated by the cutoff voltage controller and timer 215 to determine if the batteries have been charged for a time duration greater than or equal to a third time duration, at step 105. If the batteries are determined to be substantially fully charged at the end of the second time duration, at step 104, battery charging is ceased and the method of charging batteries 100 ends at step 106.

If the total charging time has not exceeded or is not equal to the third time duration, at step 105, another charging cycle 108, which has the steps 102, 103, 104, and 105, may be repeated, as required, until the total charging time has exceeded or is equal to the third time duration at step 105, and/or the steps 102, 103, and 104 may be repeated until the batteries are determined be substantially fully charged at step 104.

If the total charging time has exceeded or is equal to the third time duration at step 105, battery charging is ceased and the method of charging batteries 100 ends at step 106.

The total charging time $T_{total}$=C/Icc, where C is the capacity of the battery, and Icc is the value of the charging current supplied to the batteries, and is a constant times the sum of the first time duration T1 and the second time duration T2, where k may be defined as the constant, which is greater than or equal to 1, such that the total time $T_{total}$=k(T1+T2).

The method of charging batteries 110 is substantially the same as the method of charging batteries 100, except that the batteries B1 (222) are set to a third voltage Voltage V1 (210), which is a voltage between the first plateau 204 and the second plateau 206 of the charging profile 202, prior to shutting off the current source in the method of charging batteries 110, as shown in FIG. 2.

Figure 9:
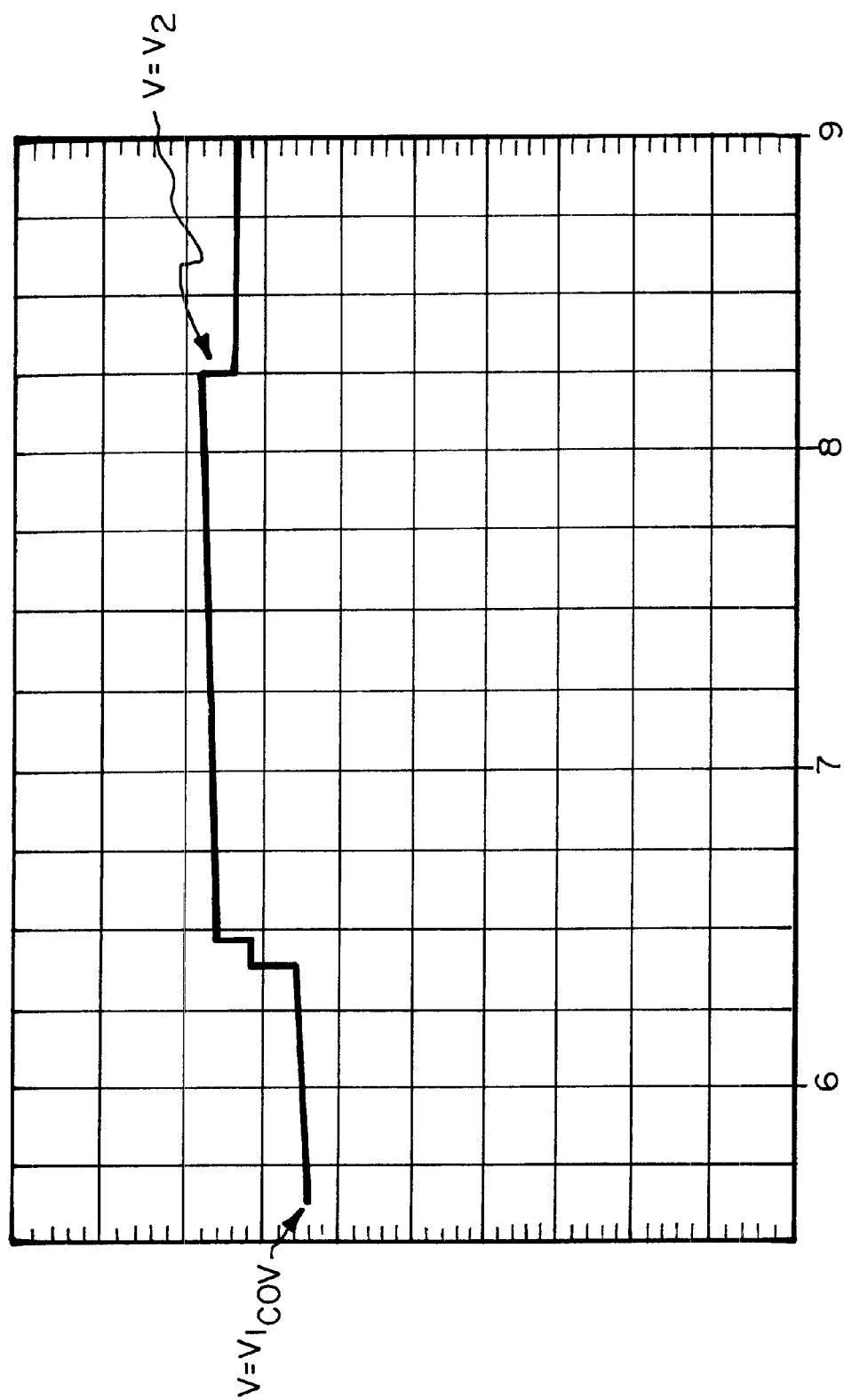
FIG. 9 is a graphical representation of an actual battery charging profile for a battery at a particular state of charge.

FIG. 9 is an actual battery charging profile of a typical silver zinc battery at a particular state of charge, starting out substantially fully charged, showing results of charging with the method of charging batteries 100 of the present invention and the battery charging system 211 of the present invention.

Each of the batteries of the battery charging system 211 can, thus, be individually charged in series without the necessity of using a plurality of Current Sources, using the method of charging batteries 100 of the present invention. Battery packs often typically have batteries in series. Thus, all batteries in a battery pack may be individually and independently charged in series to their respective cutoff voltages, thus ensuring a balanced battery back.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of charging at least one battery comprising the following steps:
    charging at least one battery at a first voltage for a first time duration;
    charging said at least one battery at a second voltage for a second time duration;
    determining state of charge of said at least one battery at the end of said second time duration;
    if said at least one battery is not substantially fully charged at said end of said second time duration, the total charging time is evaluated to determine if said at least one battery has been charged for a time duration greater than or equal to a third time duration, and if said total charging time has not exceeded or is not equal to said third time duration, charging said at least one battery at said first voltage for said first time duration and charging said batteries at said second voltage for said second time duration is repeated;
    if said at least one battery is substantially fully charged at said end of said second time duration, said at least one battery charging is ceased; or
    if said total charging time has exceeded or is equal to said third time duration at said end of said second time duration, said at least one battery charging is ceased.

2. The method according to claim 1, wherein total time required to charge said at least one battery is substantially equal to battery capacity of said at least one battery divided by charging current supplied to said at least one battery.

3. The method according to claim 1, wherein said first voltage is substantially equal to a voltage substantially at a second plateau of a charging profile of said at least one battery.

4. The method according to claim 3, wherein said first voltage is substantially equal to a voltage substantially at a second plateau of a charging profile of said at least one battery.

5. The method according to claim 1, wherein said first voltage is substantially equal to a voltage at a second plateau, prior to a steeply rising curve of a charging profile of said at least one battery.

6. The method according to claim 1, wherein said second voltage is substantially equal to a voltage slightly above a second plateau of a charging profile of said at least one battery.

7. The method according to claim 1, wherein said second voltage is substantially equal to a voltage slightly above a second plateau at a knee of a steeply rising curve of a charging profile of said at least one battery.

8. The method according to claim 1, wherein said first time duration is substantially equal to a factor multiplied by battery capacity of said at least one battery divided by charging current supplied to said at least one battery, said factor being between 0.02 and 0.06.

9. The method according to claim 1, wherein said second time duration is substantially equal to a factor multiplied said first time duration, said factor being between $3 \times 10^{-5}$ and $3 \times 10^{-3}$.

10. A method of charging at least one battery comprising the following steps:

charging at least one battery at a first voltage for a first time duration;

charging said at least one battery at a second voltage for a second time duration;

determining state of charge of said at least one battery at the end of said second time duration;

if said at least one battery is not substantially fully charged at said end of said second time duration, the total charging time is evaluated to determine if said at least one battery has been charged for a time duration greater than or equal to a third time duration, and if said total charging time has not exceeded or is not equal to said third time duration, charging said at least one battery at said first voltage for said first time duration and charging said batteries at said second voltage for said second time duration is repeated;

if said at least one battery is substantially fully charged at said end of said second time duration, setting said at least one battery to a third voltage, after which said at least one battery charging is ceased; or if said total charging time has exceeded or is equal to said third time duration at said end of said second time duration, setting said at least one battery to a third voltage, after which said at least one battery charging is ceased.

11. The method according to claim 10, wherein third voltage is substantially equal to a voltage between a first plateau and a second plateau of a charging profile of said at least one battery.

12. The method according to claim 1 wherein said steps of said method of charging said at least one battery are controlled by a cutoff voltage controller and timer.

13. The method according to claim 12 wherein said cutoff voltage controller and timer is a microcontroller.

14. The method according to claim 1 wherein said steps of said method of charging said at least one battery are controlled by a microcontroller.

15. A method of charging at least one battery comprising the following steps:

charging at least one battery at a first voltage for a first time duration;

charging said at least one battery at a second voltage for a second time duration; determining state of charge of said at least one battery at the end of said second time duration;

if said at least one battery is not substantially fully charged at said end of said second time duration, the total charging time is evaluated to determine if said at least one battery has been charged for a time duration greater than or equal to a third time duration, and if said total charging time has not exceeded or is not equal to said third time duration, charging said at least one battery at said first voltage for said first time duration and charging said batteries at said second voltage for said second time duration is repeated;

if said at least one battery is substantially fully charged at said end of said second time duration, said at least one battery charging is ceased; or if said total charging time has exceeded or is equal to said third time duration at said end of said second time duration, said at least one battery charging is ceased;

said first voltage being substantially equal to a voltage substantially at a second plateau of a charging profile of said at least one battery;

said second voltage being substantially equal to a voltage slightly above said second plateau of said charging profile of said at least one battery;

said first time duration being substantially equal to a factor multiplied by battery capacity of said at least one battery divided by charging current supplied to said at least one battery, said factor being between 0.02 and 0.06;

said second time duration being substantially equal to a factor multiplied said first time duration, said factor being between $3 \times 10^{-5}$ and $3 \times 10^{-3}$; and total time required to charge said at least one battery being substantially equal to battery capacity of said at least one battery divided by charging current supplied to said at least one battery.

16. A method of charging at least one battery comprising the following steps:

charging at least one battery at a first voltage for a first time duration;

charging said at least one battery at a second voltage for a second time duration;

determining state of charge of said at least one battery at the end of said second time duration;

if said at least one battery is not substantially fully charged at said end of said second time duration, the total charging time is evaluated to determine if said at least one battery has been charged for a time duration greater than or equal to a third time duration, and if said total charging time has not exceeded or is not equal to said third time duration, charging said at least one battery at said first voltage for said first time duration and charging said batteries at said second voltage for said second time duration is repeated;

if said at least one battery is substantially fully charged at said end of said second time duration, setting said at least one battery to a third voltage, after which said at least one battery charging is ceased; or if said total charging time has exceeded or is equal to said third time duration at said end of said second time duration, setting said at least one battery to a third voltage, after which said at least one battery charging is ceased;

said first voltage being substantially equal to a voltage substantially at a second plateau of a charging profile of said at least one battery;

said second voltage being substantially equal to a voltage slightly above said second plateau of said charging profile of said at least one battery;

said third voltage being substantially equal to a voltage between said first plateau and said second plateau of said charging profile of said at least one battery;

said first time duration being substantially equal to a factor multiplied by battery capacity of said at least one battery divided by charging current supplied to said at least one battery, said factor being between 0.02 and 0.06;

said second time duration being substantially equal to a factor multiplied said first time duration, said factor being between $3 \times 10^{-5}$ and $3 \times 10^{-3}$; and total time required to charge said at least one battery being substantially equal to battery capacity of said at least one battery divided by charging current supplied to said at least one battery.

17. A battery charging system comprising:

a current source;

a cutoff voltage controller and timer;

at least one battery;

respective ones of voltage and current regulators, which regulate voltages applied to each said respective one of said batteries and current supplied to each said respective one of said batteries;

said cutoff voltage controller and timer controlling said voltages and controlling time durations of said voltages applied to each of said respective ones of said batteries therethrough control of said voltage and current regulators;

current sensing means, which senses current flowing therethrough said batteries, said sensed current communicated thereto said cutoff voltage controller and timer; and a system voltage and current regulator, which shunts current from said batteries.

18. The battery charging system according to claim 17, wherein said battery charging system performs steps of a process of charging said at least one battery.

19. The battery charging system according to claim 17, wherein said cutoff voltage controller and timer controls steps of said process of charging said at least one battery.

20. The battery charging system according to claim 17, wherein said battery charging system performs steps of a process of charging said at least one battery comprising the following steps:

charging at least one battery at a first voltage for a first time duration;

charging said at least one battery at a second voltage for a second time duration;

determining state of charge of said at least one battery at the end of said second time duration;

if said at least one battery is not substantially fully charged at said end of said second time duration, the total charging time is evaluated to determine if said at least one battery has been charged for a time duration greater than or equal to a third time duration, and if said total charging time has not exceeded or is not equal to said third time duration, charging said at least one battery at said first voltage for said first time duration and charging said batteries at said second voltage for said second time duration is repeated;

if said at least one battery is substantially fully charged at said end of said second time duration, said at least one battery charging is ceased; or if said total charging time has exceeded or is equal to said third time duration at said end of said second time duration, said at least one battery charging is ceased;

said first voltage being substantially equal to a voltage substantially at a second plateau of a charging profile of said at least one battery;

said second voltage being substantially equal to a voltage slightly above said second plateau of said charging profile of said at least one battery;

said first time duration being substantially equal to a factor multiplied by battery capacity of said at least one battery divided by charging current supplied to said at least one battery, said factor being between 0.02 and 0.06;

said second time duration being substantially equal to a factor multiplied said first time duration, said factor being between and $3 \times 10$–$5$ and $3 \times 10$–$3$; and total time required to charge said at least one battery being substantially equal to battery capacity of said at least one battery divided by charging current supplied to said at least one battery.

21. The battery charging system according to claim 17, wherein said battery charging system performs steps of a process of charging said at least one battery comprising the following steps:

charging at least one battery at a first voltage for a first time duration;

charging said at least one battery at a second voltage for a second time duration;

determining state of charge of said at least one battery at the end of said second time duration;

if said at least one battery is not substantially fully charged at said end of said second time duration, the total charging time is evaluated to determine if said at least one battery has been charged for a time duration greater than or equal to a third time duration, and if said total charging time has not exceeded or is not equal to said third time duration, charging said at least one battery at said first voltage for said first time duration and charging said batteries at said second voltage for said second time duration is repeated;

if said at least one battery is substantially fully charged at said end of said second time duration, setting said at least one battery to a third voltage, after which said at least one battery charging is ceased; or if said total charging time has exceeded or is equal to said third time duration at said end of said second time duration, setting said at least one battery to a third voltage, after which said at least one battery charging is ceased;

said first voltage being substantially equal to a voltage substantially at a second plateau of a charging profile of said at least one battery;

said second voltage being substantially equal to a voltage slightly above said second plateau of said charging profile of said at least one battery;

said third voltage being substantially equal to a voltage between said first plateau and said second plateau of said charging profile of said at least one battery;

said first time duration being substantially equal to a factor multiplied by battery capacity of said at least one battery divided by charging current supplied to said at least one battery, said factor being between 0.02 and 0.06;

said second time duration being substantially equal to a factor multiplied said first time duration, said factor being between $3 \times 10^{-5}$ and $3 \times 10^{-3}$; and total time required to charge said at least one battery being substantially equal to battery capacity of said at least one battery divided by charging current supplied to said at least one battery.

\* \* \* \* \*